US006776266B2

(12) United States Patent
Fuglewicz et al.

(10) Patent No.: US 6,776,266 B2
(45) Date of Patent: Aug. 17, 2004

(54) SMART DIGITAL BRAKE STROKE SENSOR

(75) Inventors: Daniel P. Fuglewicz, Depew, NY (US); David G. Schabel, Clarence Center, NY (US)

(73) Assignee: Veridian Engineering, Inc., Buffalo, NY (US)

( * ) Notice: Subject to any disclaimer, the term of this patent is extended or adjusted under 35 U.S.C. 154(b) by 0 days.

(21) Appl. No.: 10/317,207

(22) Filed: Dec. 12, 2002

(65) Prior Publication Data

US 2004/0112684 A1 Jun. 17, 2004

(51) Int. Cl.[7] ............................................. F16D 66/00
(52) U.S. Cl. ........................... 188/1.11 E; 188/1.11 L
(58) Field of Search ........................ 188/1.11 E, 1.11 L; 73/129, 130; 16/208; 340/454

(56) References Cited

U.S. PATENT DOCUMENTS 6,352,137 B1 * 3/2002 Stegall et al. ............ 188/1.11 L
6,411,206 B1 * 6/2002 Weant et al. ................ 340/479
6,417,768 B2 * 7/2002 Osterman et al. ............ 340/379
2003/0024773 A1 * 2/2003 Goncalves et al. ...... 188/1.11 E

OTHER PUBLICATIONS

Fuglewicz, "Commercial Motor Vehicle (CMV) On–Board Monitoring Technology Demonstration, Final Report", Veridian Corporation, Engineering Division, Jan. 2001.
"Monthly Progress Report, Reporting Period No. 27," Veridian Engineering, pp. 1–5, 2000.
"Commercial Vehicle Safety System Program," Veridian Engineering, pp. 1–45, Jan. 23, 2001.

* cited by examiner

Primary Examiner—Chris Schwartz
(74) Attorney, Agent, or Firm—Steptoe & Johnson LLP

(57) ABSTRACT

A brake stroke sensor is disclosed. In particular, a digital brake stroke sensor capable of indicating a position of pushrod linear displacement is disclosed. The brake stroke sensor includes a prism attached to the pushrod. The prism includes a number of markers to code position information. Sensors read the coded position information and electronics convert the position information to a form useable humans.

22 Claims, 10 Drawing Sheets

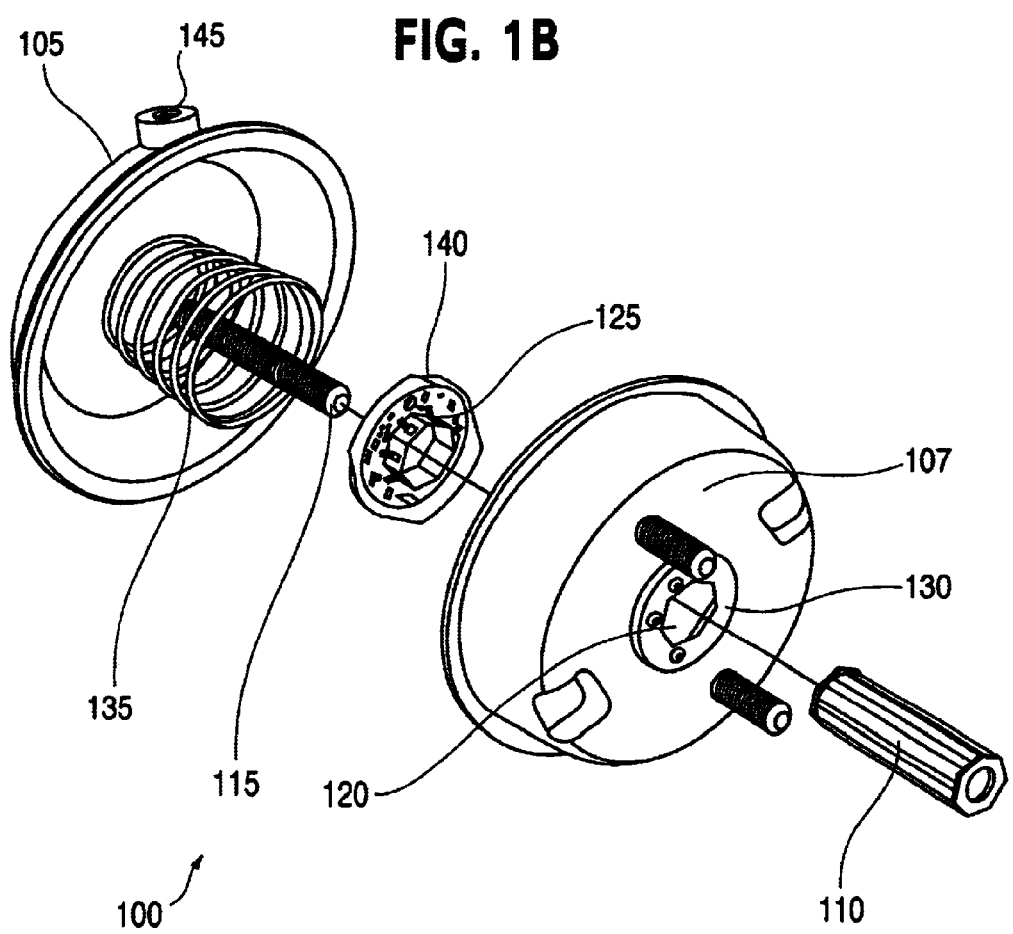

FIG. 3B

| B4 | B3 | B2 | B1 | B0 | VALUE | CHANGES | INDEX |
|---|---|---|---|---|---|---|---|
| 0 | 0 | 0 | 0 | 0 | 0 | N/A | 0 |
| 0 | 0 | 0 | 0 | 1 | 1 | 1 | 1 |
| 0 | 0 | 0 | 1 | 1 | 3 | 1 | 2 |
| 0 | 0 | 0 | 1 | 0 | 2 | 1 | 3 |
| 0 | 0 | 1 | 1 | 0 | 6 | 1 | 4 |
| 0 | 0 | 1 | 1 | 1 | 7 | 1 | 5 |
| 0 | 0 | 1 | 0 | 1 | 5 | 1 | 6 |
| 0 | 0 | 1 | 0 | 0 | 4 | 1 | 7 |
| 0 | 1 | 1 | 0 | 0 | 12 | 1 | 8 |
| 0 | 1 | 1 | 0 | 1 | 13 | 1 | 9 |
| 0 | 1 | 1 | 1 | 1 | 15 | 1 | 10 |
| 0 | 1 | 1 | 1 | 0 | 14 | 1 | 11 |
| 0 | 1 | 0 | 1 | 0 | 10 | 1 | 12 |
| 0 | 1 | 0 | 1 | 1 | 11 | 1 | 13 |
| 0 | 1 | 0 | 0 | 1 | 9 | 1 | 14 |
| 0 | 1 | 0 | 0 | 0 | 8 | 1 | 15 |
| 1 | 1 | 0 | 0 | 0 | 24 | 1 | 16 |
| 1 | 1 | 0 | 0 | 1 | 25 | 1 | 17 |

FIG. 3A

| M4 | M3 | M2 | M1 | M0 |
|---|---|---|---|---|
|  |  |  |  |  |

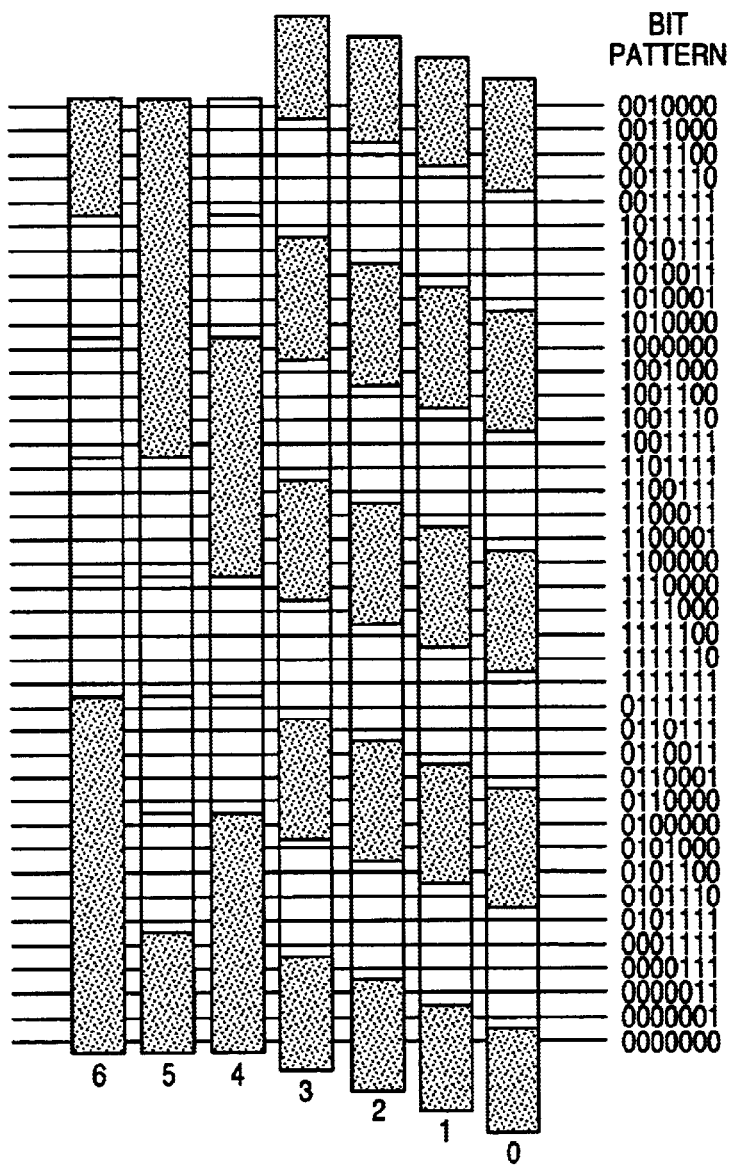

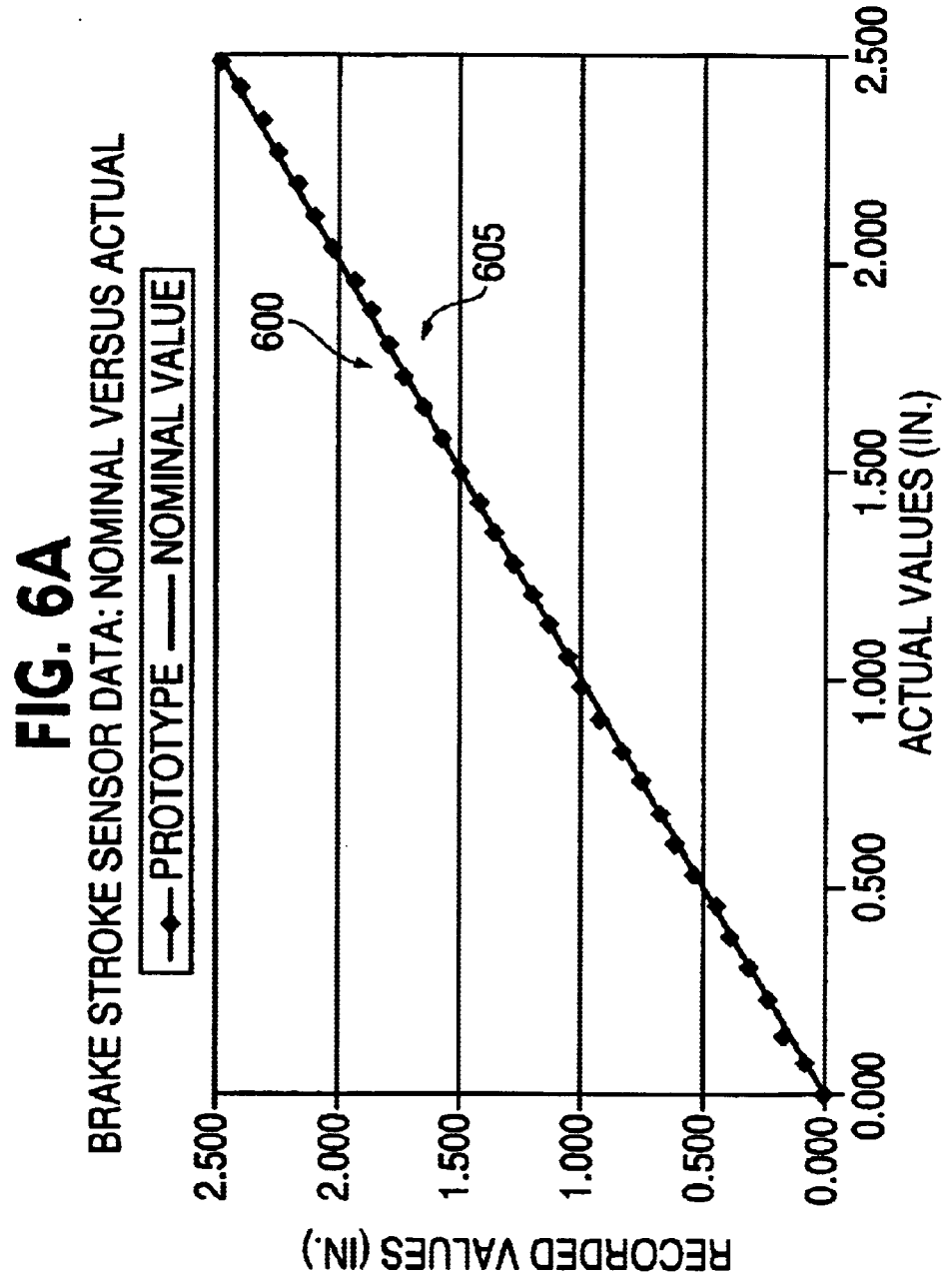

SMART DIGITAL BRAKE STROKE SENSOR

BACKGROUND OF THE INVENTION

1. Field of the Invention

The invention relates to a brake stroke sensor. In particular, the invention relates to a digital brake stroke sensor for determining a position of a pushrod used in an airbrake chamber.

2. Discussion of Background Information

Commercial vehicles typically use air-powered brake systems. Forcing compressed air into a brake actuator chamber pushes a pushrod out of a brake actuator service chamber. The emerging pushrod operates an S cam or disk brake mechanism, which forces the brake shoes/pads against the drums/rotors.

Over time, the brake shoes or pads associated with an individual wheel will begin to wear. The pushrod must accordingly travel a greater distance in order to force the brake shoes or pads against the drums or rotors to provide appropriate braking friction. Because the pushrods have a limited length of travel, the brake shoes or pads can wear down to the point that a fully extended pushrod no longer provides adequate pressure to exert sufficient braking force. Many agencies enforcing federal and state vehicle regulations therefore utilize the length of pushrod travel as a measure of whether the brakes are functioning properly.

It is desirable to maintain and monitor the proper functioning of a vehicle's brake system to enhance the safety of the driver and to the general public, and to help determine whether it meets federal safety standards for correct operation. If the braking system of a commercial vehicle does not meet federal operational requirements, the commercial vehicle can be placed out-of-service until the problematic components are repaired and returned to acceptable operational limits.

Electronic parametric monitoring devices that warn of an out-of-tolerance condition have not been widely used and have not been generally installed by original equipment manufacturers on new commercial vehicles. After market electronic systems tend to be generally lacking, expensive, not readily compatible with various types of vehicles, and difficult to install. In addition, these systems do not relay the actual pushrod stroke to the vehicle operator.

SUMMARY OF THE INVENTION

According to an embodiment of the invention, a brake stroke sensor for determining a position of a brake chamber actuator pushrod is provided. At least two sequences of magnets are configured to move in association with the pushrod. The at least two sequences of magnets collectively form a Grey code. A sensor system is configured to detect a polarity of the magnets at positions adjacent to the sensor system and produce at least one signal indicative of the polarity. A processor is configured to convert the at least one signal into an indication of the position of the pushrod.

The above embodiment may have various optional features. By way of non-limiting example, a first of the at least two sequences of magnets can be shifted relative to a second of the at least two sequences of magnets. The sensor system an include a sensor for each sequence of the at least two sequences of magnets. A first sensor of the sensor system can be shifted relative to a second sensor of the sensor system. Each sensor can be a Hall-Effect switch. The at least two columns can be seven columns. The at least two sequences of magnets can be out of electrical contact with the sensor system. The at least two sequences of magnets can be enclosed within a non-conductive covering. The at least two sequences of magnets can be disposed about the pushrod at substantially equidistant positions.

According to another embodiment of the invention, a brake stroke sensor for detecting a position of a brake pushrod is provided. A plurality of columns of magnets are configured to move in accordance with the pushrod, at least one of the plurality of columns of magnets being shifted along its axis relative to another column of magnets. A sensor for each column of magnets the sensor being configured to detect a pole of a magnet in the column of magnets within a sensing range of the sensor. A processor is configured to receive data originating from each sensor and to provide an indication of a position of the brake pushrod.

The above embodiment may have various optional features. By way of non-limiting example, the plurality of columns of magnets can extend axially along the pushrod and collectively define a plurality of rings of magnets radially along the pushrod, such that the plurality of rings of magnets collectively form a Grey code. A non-conductive sheath can enclose the plurality of columns of magnets. The plurality of columns of magnets can be disposed about the pushrod at substantially equidistant positions. The sensors can be Hall-effect switches.

According to yet another embodiment of the invention, a method of determining a position of a brake actuator pushrod is provided. The method includes configuring a plurality of columns of magnets to move in accordance with the brake actuator pushrod, at least one column of magnets being shifted in a direction parallel to the brake actuator pushrod relative to another column of magnets, monitoring, as the pushrod moves relative to a location, a polarity of each of the plurality of columns of magnets adjacent the location, converting the results of the monitoring into an indicator signal representing the position of the brake actuator pushrod, and outputting, in accordance with the indicator signal, data that indicates the position of the brake actuator pushrod.

The above embodiment may have various optional features. By way of non-limiting example, at most one of the detected slates of the plurality of magnets changes at a time. The configuring can include configuring the plurality of columns of magnets to define a Grey code. The monitoring can include providing Hall-effect switches.

According to yet another embodiment of the invention, a method of detecting a relative position of a brake pushrod is provided. The method includes configuring a plurality of magnets to move in accordance with the pushrod, where the plurality of magnets collectively form a Grey code, arranging a sensor system at a location, sensing, by the sensor system, a plurality of magnet poles from the plurality of magnets adjacent the location, and producing, from the results of the sensing, a positional signal being representative of the relative position of the brake pushrod.

The above embodiment may include various optional features. By way of non-limiting example, at most one of the detected states of the plurality of magnets changes at a time. The configuring may include configuring the plurality of columns of magnets to define a Grey code. The sensing may include sensing using Hall-Effect switches.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 1B depicts an exploded view of the brake actuator assembly of FIG. 1A;

FIG. 3A is a schematic diagram of a magnet arrangement for a prism;

FIG. 3B is a chart illustrating a Grey code corresponding to the magnet arrangement of FIG. 3A;

FIG. 4A is a schematic diagram of a magnet arrangement for a prism in an alternate embodiment of the present invention;

FIG. 4B is a chart illustrating a Grey code corresponding to the magnet arrangement of FIG. 4A;

FIG. 6A is a graph depicting ideal and measured data for a working embodiment of the present invention.

DETAILED DESCRIPTION OF THE EXEMPLARY EMBODIMENT

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1A:
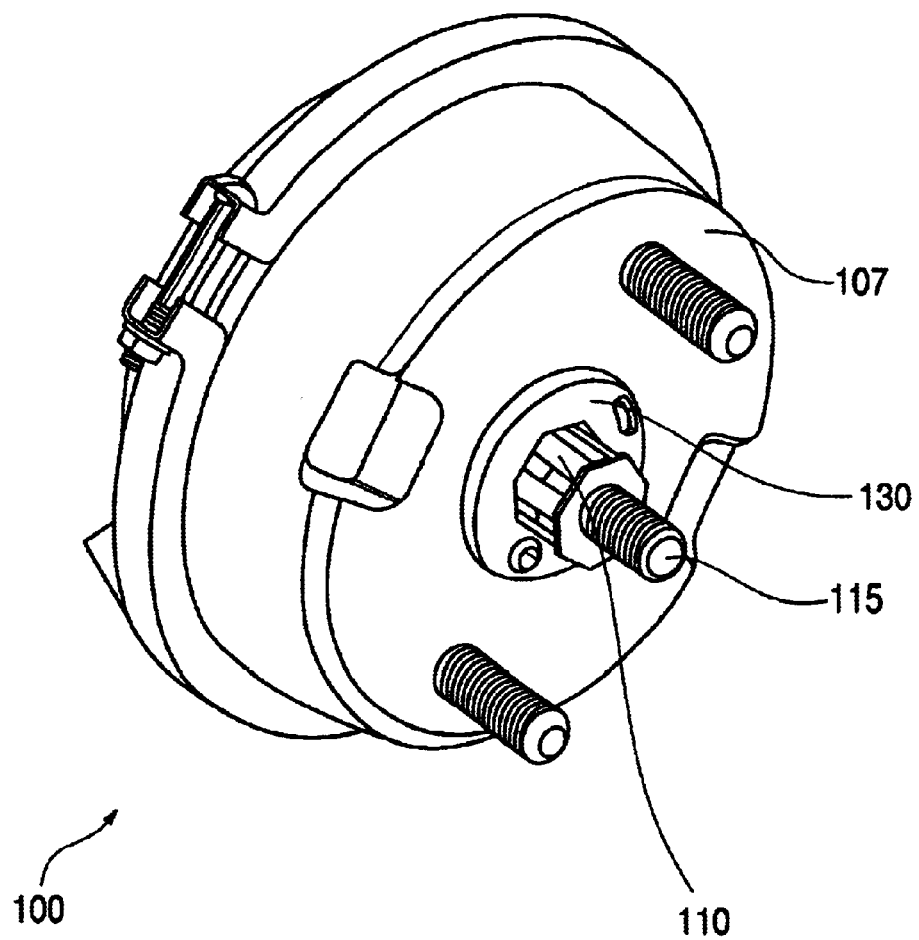
FIG. 1A depicts a brake chamber assembly equipped with a preferred embodiment of the present invention.

FIGS. 1A and 1B are assembled and exploded views, respectfully, of a brake actuator assembly 100 equipped with a brake stroke sensor system according to an embodiment of the present invention. Brake actuator assembly 100 includes a rear brake chamber portion 105 and a front brake chamber portion 107. Front brake chamber portion 107 has a center hole 120 through which a pushrod 115 and an attached prism 110 pass. (As used herein, the term "prism" means a polyhedron with two like polygonal faces lying in parallel planes, with the other faces being right parallelograms.) Pushrod 115 is attached to prism 110 at its base using a nut threaded onto the pushrod (not shown). Both pushrod 115 and prism 110 are surrounded by a return spring 135, which provides support for a sensor tray 140. A sensor tray cover 130 circumscribes hole 120 and holds sensor tray 140 in place. Sensor tray 140 contains sensor electronics 125 and is filled with a known potting compound to provide sealing and weatherproofing. A three-wire cable (not shown), sealed at sensor tray 140, connects sensor electronics 125 to an outside automotive system by way of a water-resistant connector.

Figure 2A:
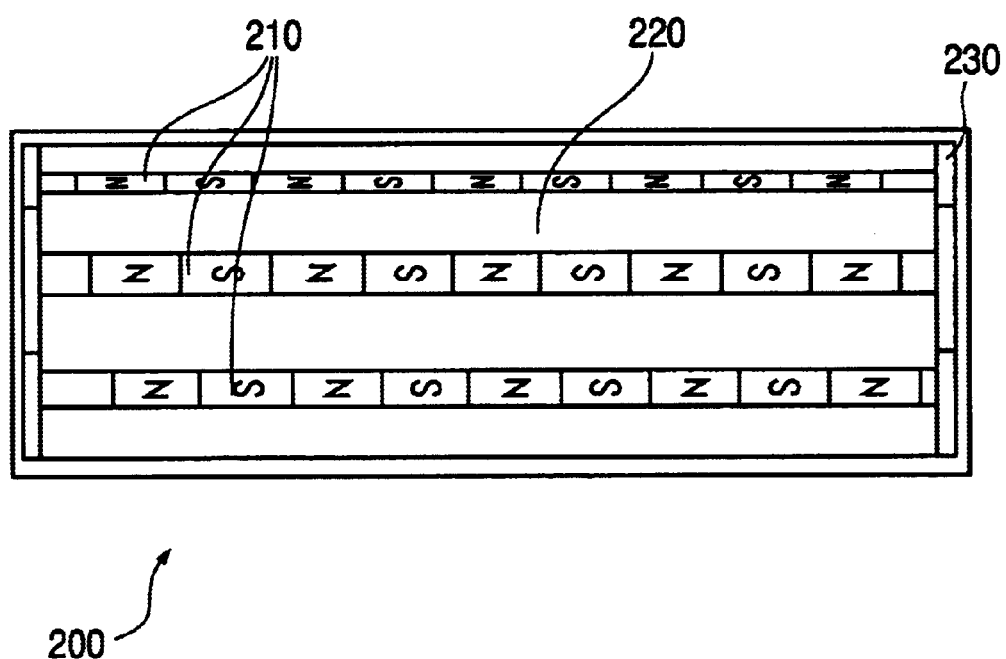
FIG. 2A depicts a prism assembly.
Figure 2B:
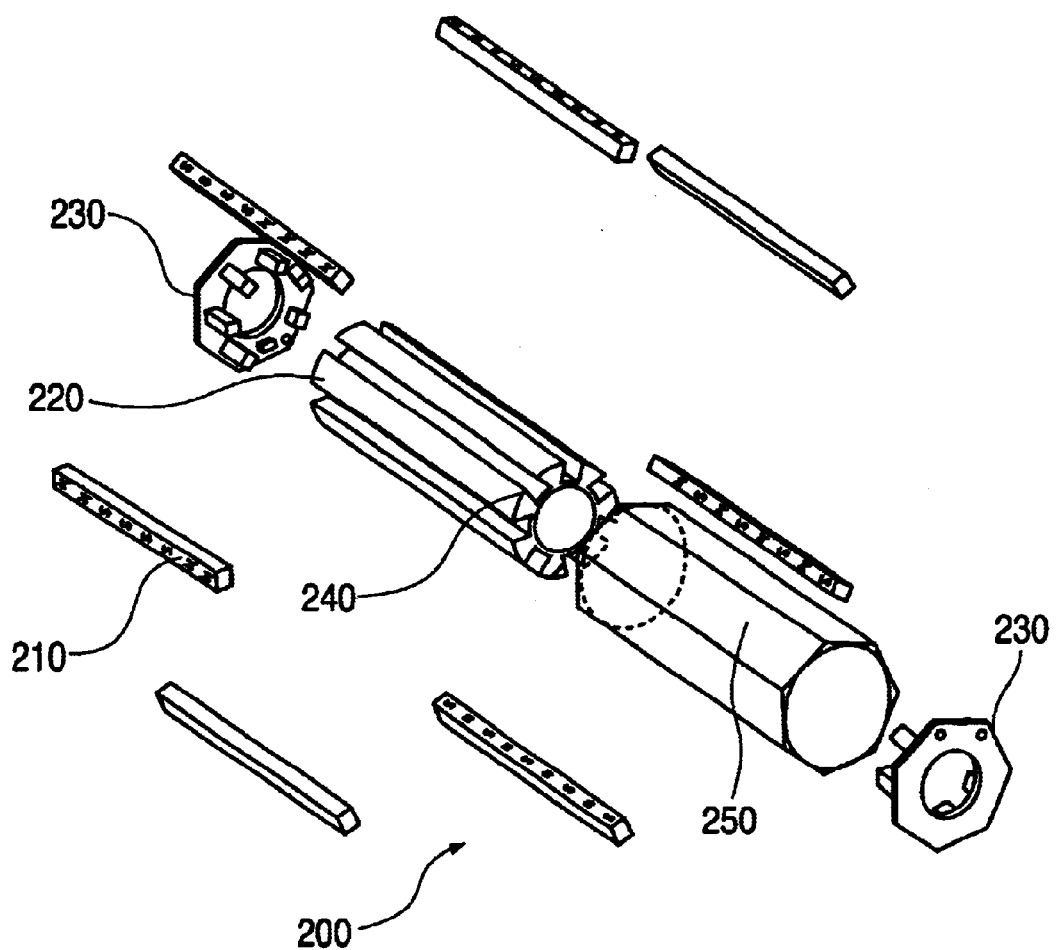
FIG. 2B depicts an exploded view of the prism assembly of FIG. 2A.

FIGS. 2A and 2B illustrate assembled and exploded views of prism 200 according to an embodiment of the present invention. Prism includes a core member 220 and end caps 230, both of which are preferably manufactured of anodized aluminum, although other materials such as plastic may be used. End caps 230 are preferably identical and interchangeable in order to minimize manufacturing costs. Each of the sides of core member 220 (the embodiment of FIG. 2A has seven sides) includes a slot 240 for housing a column of magnets 210. Upon assembly, the entire prism is sheathed in a DERLIN™ plastic sleeve 250. Plastic sleeve 250 helps to minimize friction between prism 200 and the sensor tray (140 in FIG. 1B), thereby increasing sensor life and reliability and protecting the magnets from the external environment. Preferably, prism 200 does not contact sensor tray 140. However, the radial design of prism 200 minimizes wear due to the even distribution of any contact between prism 200 and sensor tray (140 in FIG. 1B).

Magnets 210 are preferably right parallelepiped in shape with square cross-sections, where the cross sections face outward from the prism axis. The magnets are positioned such that a pole extends radially from the center of prism 220; that is, the line between the magnet poles of an individual bar magnet is perpendicular to the axis of the prism. Magnets 210 are preferably manufactured of neodymium. The particular orientation of each magnet 210 (i.e., which pole of each magnet 210 that extends radially outward) collectively creates a magnetic code, which is used to determine pushrod position. The radial design minimizes magnetic cross-talk between the levels of magnets in prism 200.

In the present embodiment, the magnetic field of magnets 210 pass through both plastic sheath 250 and sensor tray 140 to reach the underlying sensor electronics 125. Prism 200 thus preferably does not come into direct physical contact with sensor electronics 125 (although it does come into indirect contact through the noted intervening surfaces). Prism 200 thus also preferably does not come into electrical contact with sensor electronics 125, such that there are no exposed conductive elements that are otherwise exposed to the exterior environment.

FIG. 3A is a schematic diagram of a five-sided prism according to an embodiment of the present invention. The particular orientation of each magnet (i.e., whether the north or south pole faces outward from the center of prism 200) is used to code position information of the pushrod. Each column in FIG. 3A represents a column of magnets in the five-sided prism of this embodiment. Each of the eighteen block entries in a column of FIG. 3A represents a polarity of the corresponding magnet in the prism. A black entry block in FIG. 3A represents a north pole facing outward from the prism, and a white entry block represents a south pole facing outward. Each row of FIG. 3A represents a tier of magnets on the prism. That is, there are five magnets at any level in the prism represented in FIG. 3A: one for each of the five sides. The five magnets at a given tier or level are referred to as a "ring." Hence, the rows of FIG. 3A represent prism rings in block form. FIG. 3A illustrates that the topmost ring has all north poles facing out from the prism axis, while the magnets of the bottommost ring have outward-facing poles: south, south, north, north, south.

FIG. 3B is a diagram illustrating the information encoded by the magnet arrangement depicted in FIG. 3A. The first five columns of FIG. 3B correspond to the five columns of FIG. 3A, where a north pole is represented by a "0" binary digit ("bit") and a south pole by a "1" bit. By way of non-limiting example, the topmost ring corresponds to the binary number 00000, which represents the decimal value zero (0). The bottommost ring corresponds to the binary number 1001, which represents the decimal value 25. The sixth column of FIG. 3B contains the decimal values of the binary numbers formed by the first five columns.

It is from the decimal values or binary numbers that this embodiment of the present invention calculates a position of the pushrod. The decimal values or binary numbers are mapped to an index number, which corresponds to a position of the pushrod. The eighth column of FIG. 3B contains these index numbers. For example, the decimal value of the first row is zero, which is mapped to an index number of zero. The decimal value of the last row is 25, which is mapped to a index of 17. The decimal values (or binary numbers) may be alternately, or in addition, mapped to an absolute brake stroke position, measured in units such as inches or centimeters. In that case, the measurement may represent brake stroke, where 0" (or 0 cm) corresponds to the pushrod's home position. The binary numbers (or decimal values) are mapped to index numbers (or absolute brake stroke position) by way of a computer look-up table.

Figure 3C:
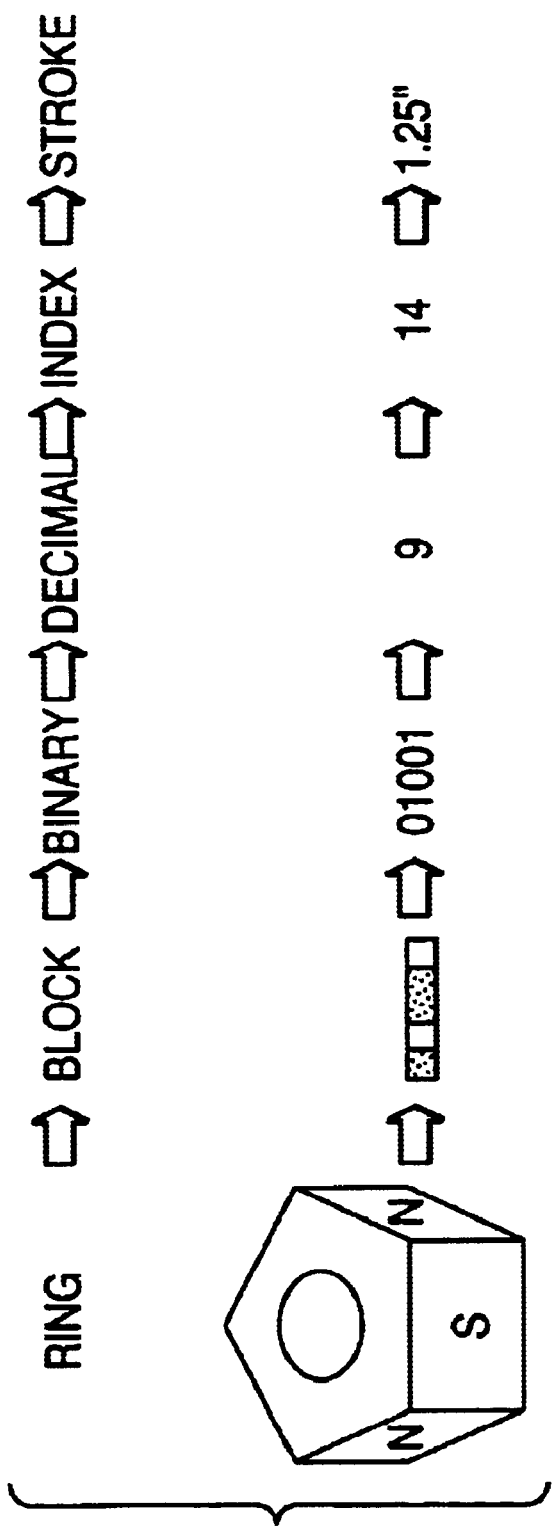
FIG. 3C is an example association between a physical magnet arrangement and an index number representing pushrod position.

FIG. 3C illustrates how the fifteenth ring of the prism represented in FIG. 3A is associated with its schematic block representation, binary number, decimal value, and index number.

Any coding scheme may be used for the magnetic rings. However, in some cases the transition from one ring to the next in which two or more bits differ can yield false readings. The basis for such false readings is that the changes of different bits do not occur at the same time, such that intermediate false values maybe read during transition periods. To address this issue, the rings are preferably arranged such that the binary numbers represented by any two adjacent rings differ by only one bit, which eliminates the possibility of non-simultaneous bit changes. As is readily observable by examining the first five columns of FIG. 3B, the binary representations of any adjacent two of these numbers differ by only one bit. The seventh column of FIG. 3B tracks these bit changes from the previous binary number on the list.

Ordered sequences of numbers with the property that any two adjacent numbers in the sequence have binary representations that differ by exactly one bit are called binary Grey codes (hereinafter "Grey codes"). Grey codes are used to select the orientation of the magnets in the magnet rings (and therefore the orientation for the columns) in the prism. The sixth column of FIG. 3B comprises one such Grey code: 0, 1, 3, 2, 6, 7, 5, 4, 12, 13, 15, 14, 10, 11, 9, 8, 24, 25.

As used herein, Grey codes may be of any length in terms of the quantity of numbers comprising a particular Grey code. Further, a Grey code may be a reflected Grey code or any other type of Grey code. No particular Grey code is contemplated, and the numbers within the code need not be in any type of order (numerical or otherwise). Preferably, all of the individual numbers in the Grey code are unique and can therefore independently indicate a position. In the alternative, individual numbers can be duplicative if sequences are being monitored (for example, a number code 1 that follows a number code 3 can be recognized as different from a number code 1 that follows a number code 24).

Greater levels of resolution may be obtained by dividing the length of the prism into more coded ring sections and using smaller magnets. To achieve higher resolution without requiring a reduction in magnet size, the magnets in some prism columns can be offset or shifted (i.e., phased) with respect to each-other. FIG. 4A is a schematic diagram of a prism of an alternate embodiment with improved position accuracy using shifted prisms. The incremental shift determines the accuracy obtained by this technique.

FIG. 4A represents a seven-column magnet arrangement having three unshifted columns and four additional columns that are shifted relative to each-other and to the unshifted columns. All of the columns use magnets of a fixed width, in this case 0.375". The first of the four shifted columns is shifted downwards by ⅕ of the magnet width of 0.375", or 0.075" relative to the first three columns. The second of the four shifted columns is shifted by ⅖ of 0.375", or 0.150" relative to the first three columns. The third and fourth shifted columns are each shifted an additional 0.075" relative to the preceding column. One additional magnet is added to each of the shifted columns in order to account for gaps produced by the shifting. The rows of FIG. 4A are determined by a width of ⅕ the width of a magnet, rather than the entire width of a magnet as in the embodiment of FIGS. 3A and 3B. Thus, even though an entire unshifted column is spanned by the width of eight magnets, there are 40 rows, which yields a resolution of 40 increments along the stroke of the pushrod. In this manner, a resolution of ⅕ of the width of a single magnet is achieved.

FIG. 4B depicts how the magnet ring patterns are converted to a brake stroke measurement. Note that the rows of FIG. 4A correspond to a Grey code, where a black block represents a north pole and "0" bit and a white block represents a south pole and "1" bit, and at most one bit differs between adjacent rows. The binary numbers associated with this Grey code are illustrated in the first column of FIG. 4B. The second column depicts the decimal values of these bit patterns: 16, 24, 28, 30, 31, 95, 87, 83, 81, 80, 64, 72, 76, 78, 79, 111, 103, 99, 97, 96, 112, 120, 124, 126, 127, 63, 55, 51, 49, 48, 32, 40, 44, 46, 47, 15, 7, 3, 1, 0. The third column depicts an actual position of the pushrod in terms of brake stroke inches. This column is determined by mapping the decimal values directly to measurements in inches using a look-up table. Note that these values are achieved using magnets each of whose width spans five rows.

Figure 5:
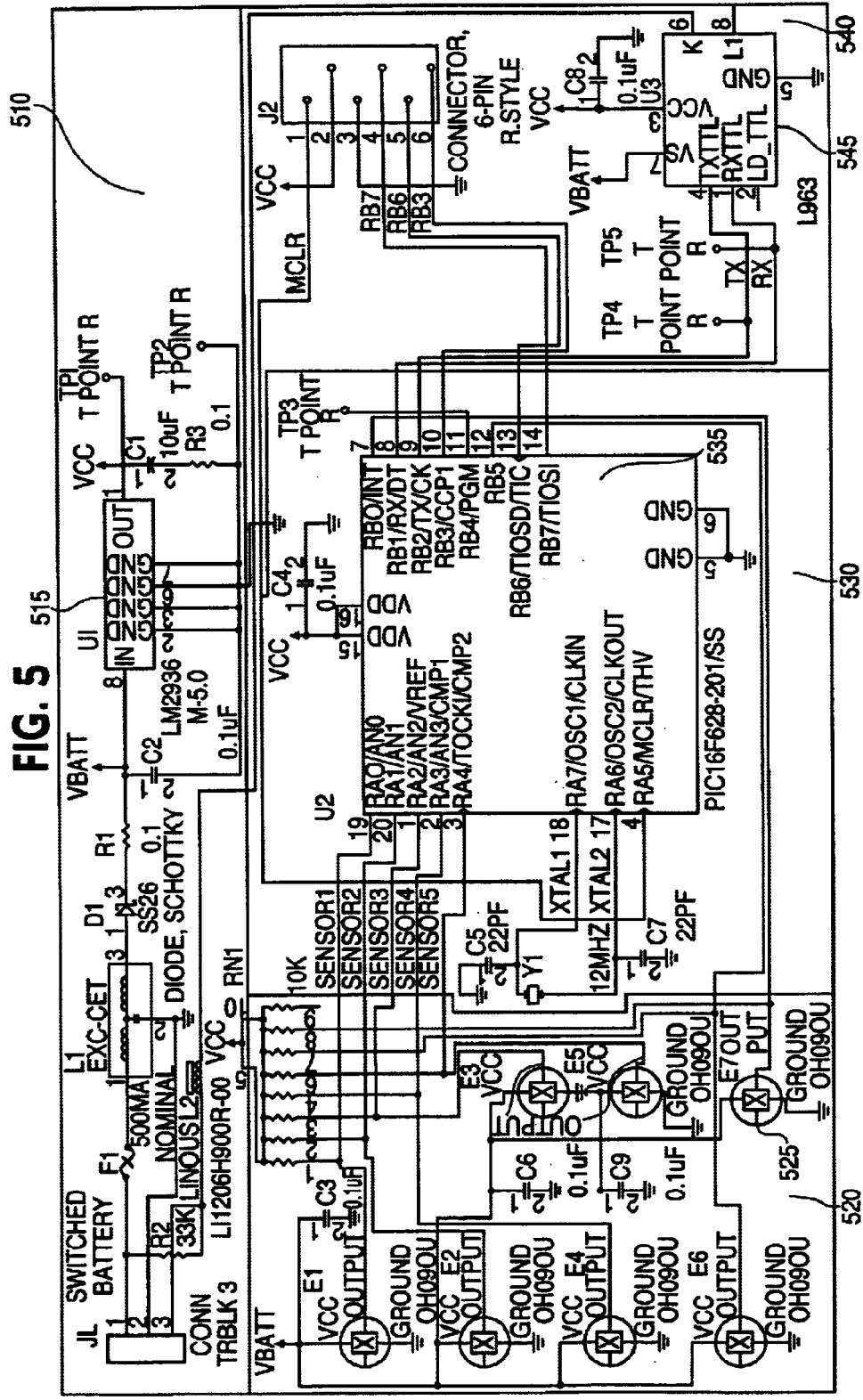
FIG. 5 is a circuit schematic for one embodiment of the present invention.

FIG. 5 is a circuit schematic of the electronics of an embodiment of the present invention. The circuitry includes four portions: a LIN bus portion 540, a power conditioning portion 510, a Hall-effect switch portion 520, and a microcontroller portion 530. LIN bus portion 540 serves to interface and connect the other sensors together using the Local Interconnect Network protocol. This protocol enables two-way communication using a single wire along with vehicle chassis ground. LIN controller 545 is preferably a L9637 manufactured by SGS/Thompson, although other chips may be used. This chip implements ISO 9141 transceiver standards.

Power conditioning portion 510 serves to provide power to the other circuit portions. Power conditioning portion 510 also regulates power using LM2936M-5.0 regulator 515 manufactured by National Semiconductor, although other regulators may be used. Power conditioning portion 510 preferably includes a self-resetting or other type of fuse for circuit protection.

Hall-effect switch portion 520 groups, provides power to, and gathers information from the Hall effect switches 525. Hall Effect switches 525 are preferably model OH090U manufactured by Optek, although other may be used. The embodiment allows each sensor (and the entire electronics circuitry) to be interfaced to other devices using three wires: communications, power, and vehicle ground. Of course, other wiring configurations could be used.

Microcontroller portion 530 preferably includes a model PIC16F873 microcontroller manufactured by Microchip, which receives information provided from Hall-Effect portion 520 and provides data to an output. Microchip model PIC16F873 is capable of reprogramming its internal FLASH memory via LIN bus portion 540, which allows for program update without the need for hardware replacement. Alternately, a Microchip model PIC 16F628 may be used if reprogramming capability is not required.

Other chips may also be used. Microcontroller 535 serves to map the information received from Hall-effect switch portion 520 to a pushrod position as measured, by way of non-limiting example, in inches. Microcontroller 535 includes a look-up table for this purpose. The circuitry of FIG. 5 is housed in the sensor tray (140 in FIG. 1B), and all of the components are rated for automotive service (−40° C. to +85° C.).

Sensor electronics 125 preferably include a Hall Effect switch 525 for each column of magnets 210. However, the invention is not so limited, as any number of sensors, or any type of sensors, may be used.

An operation overview of an embodiment of the present invention is now presented in reference to FIGS. 1A and 1B. With no brakes applied, pushrod 115 is predominantly retracted into the brake actuator assembly 100 (the pushrod's "home position"). Applying vehicle brakes causes pushrod 115 and attached prism 110 to extend from front brake chamber portion 107, and releasing the brakes allows spring 135 to return pushrod 115 to its home position. Prism 10 moves in synchronization with pushrod 115 during movement of pushrod 115. Sensor electronics 125 detects the coded rings of magnets on prism 10 as each ring passes sensor electronics 125 and forwards the detected information to a processor 535. The disclosed embodiments do not affect the normal operation of the actuator assembly, and there is no known common failure mode that would prevent the brakes from being actuated. Processor 535 decodes the detected information and uses it to calculate a number representing a position of the pushrod. This number is used to form an output.

The sensor electronics provide an output to the vehicle system. This output may be used to a drive human interface such as, by way of non-limiting example, a digital readout, a series of LEDs, a display section on a computer monitor, an audible alarm. This output may also be used to drive data to a remote system through an RF link or a telematics device. The electronics and sensors are capable of determining pushrod position and movement, including velocity and acceleration. From these and other parameters, the human interface may be used to provide alerts including, but not limited to: Internal Error (system fails self-check), Brake Chamber Non-Functional (no pushrod movement is detected), Over-Stroke Condition (pushrod moves too far), Brake Hung (pushrod stuck in a position other than home position), Faulty Slack Adjuster Detected (slack adjuster fails to maintain the brake stroke within acceptable limits), and Abnormal Brake Shoe/Pad Wear (brake stroke is increasing at an abnormally high rate).

FIG. 6A is a plot of data 600 measured by a working embodiment of the present invention. FIG. 6A also illustrates a plot 605 of ideal data. The y-axis represents values (in inches) measured by the sensors of the working embodiment, while the x-axis represents pushrod displacement (also in inches) as measured on the working embodiment. As is readily observable by examining FIG. 6A, there is a high degree of accuracy, indicating a good match between predicted and experimental results.

Figure 6B:
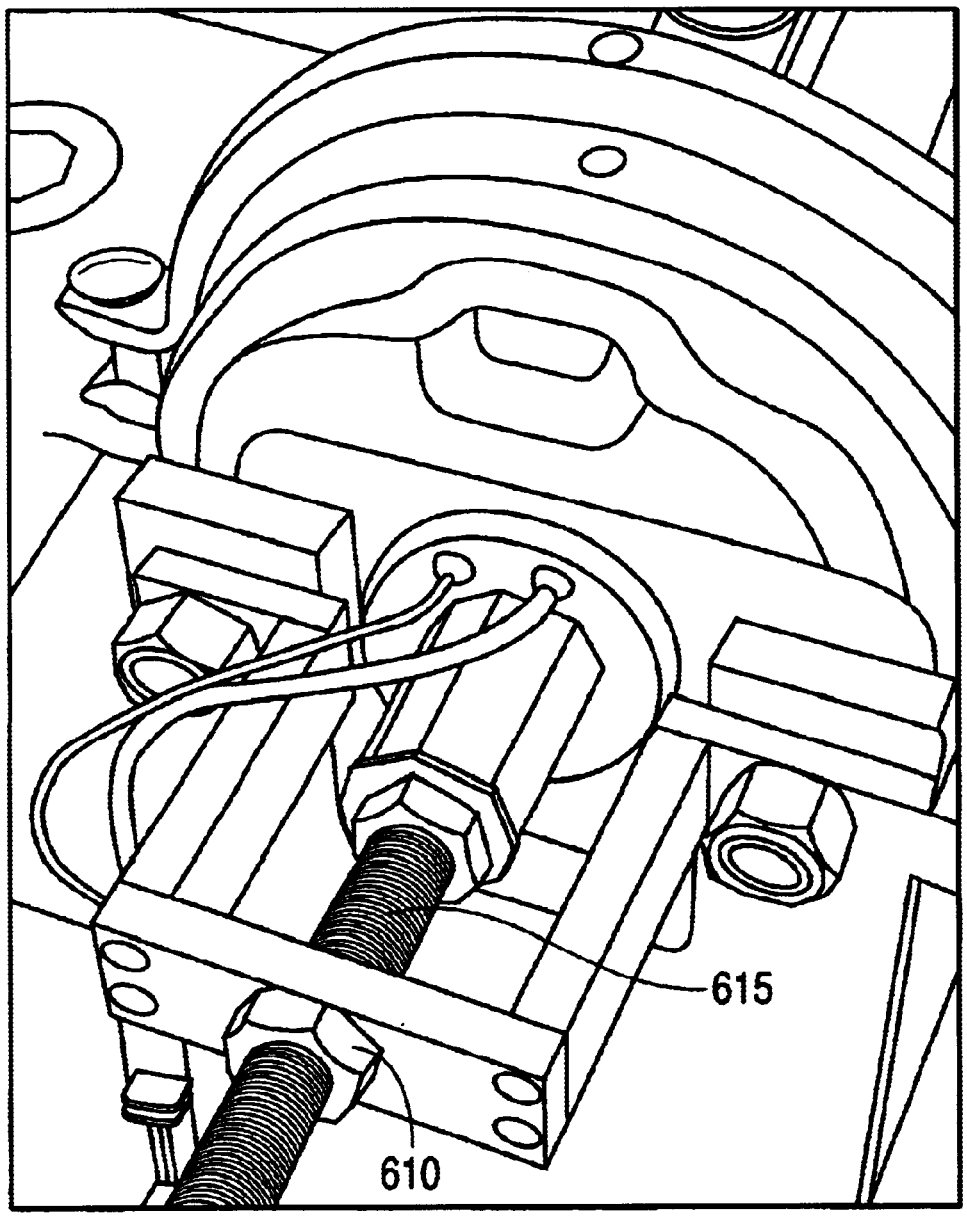
FIG. 6B is an illustration of the working embodiment of the present invention used to produce the data of FIG. 6A.

FIG. 6B illustrates the embodiment of the present invention used to produce the data of FIG. 6A. The inventors bench mounted the embodiment and employed a jacking nut 610 to pull pushrod 615 out of the brake chamber. After each incremental turn of jacking nut 610, the inventors noted the results indicated by the electronics, and also measured the pushrod displacement using calipers. These results were plotted in FIG. 6A.

The digital design of the aforementioned embodiments of the present invention provides many advantages. The assembly is insensitive to temperature and humidity, and is resistant to water and other chemicals. No set-up, calibration, or adjustment is required once the system is properly installed. An internal program automatically determines the pushrod's home position. In addition, the microprocessor stores the type of brake actuator assembly (i.e., the type of brake chamber) in which it is installed. This allows the output to report not only the pushrod position, but also the maximum allowable pushrod stroke as defined by, e.g., CVSA Out-Of-Service Criteria. The microcontroller also provides for self-check and internal fault detection.

The prism admits many variations in alternate embodiments of the present invention. Any number of magnets may be used per ring. By way of non-limiting example, one or more magnets could be used for a single ring. Larger magnets that overlap between rings or columns could also be used. Any combination of these single or larger magnet arrangements among columns and rings are contemplated. Multi-pole magnets may be used in the prism instead of, or in addition to, single pole magnets. Multi-pole magnets are magnets that have more than one north and/or south pole. Using multi-pole magnets reduces the number of parts required to construct the prism. By way of non-limiting example, the prism may have 3, 4, 5, 6, 7, or any other number of sides. The prism may also be cylinder-shaped instead of prism-shaped, in which case the magnet faces may be rounded to conform to the arcuate surface of the cylinder. The magnets may be fabricated from any ferromagnetic material such as, but not limited to, appropriate ferrous or rare earth metals. The magnets may be shaped as, by way of non-limiting example, right circular cylinders, oval cylinders, or parallelepipeds with rectangular or other cross-sections. Preferably, the shape and composition of the magnets are chosen to produce sharp magnetic gradient edges. The roles of the north and south poles in coding position information are interchangeable.

Still other embodiments of the present invention include variations in the number of magnet columns and their shifting. Any number of magnet columns can be used, with any number of those shifted. Greater accuracy can be achieved by shifting a greater number of columns than those illustrated in FIGS. 4A and 4B. By way of non-limiting example, an additional shifted column could be added to the pattern illustrated by FIG. 4A, which would yield a resolution of ⅙ of 0.375", or 0.0625" after the pattern and shifts were adjusted accordingly. Fewer or more columns may also be used.

Still other embodiments of the present invention shift the sensors instead of shifting the magnets in the prism. Shifting the sensors produces the same result as shifting the magnets (greater accuracy), as long as the sensors are shifted such that their view of the magnets corresponds to unshifted sensors detecting shifted magnets. More or fewer sensors may also be used.

In other embodiments of the present invention, sequences may be used that are not Grey codes. That is, alternate embodiments may employ prisms with adjacent magnet rings whose associated binary numbers differ by more than one bit. As a result, signal processing or other mechanisms are required to prevent inaccurate intermittent results.

In still other embodiments of the present invention, other types of marker/sensor combinations may be used. For example, the markers could have states such as reflective versus absorptive of light, and the sensors could be light emitters and detectors. The light maybe infrared or any other wavelength. Other types of marker/sensor pairs may also be used.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A brake stroke sensor for determining a position of a brake chamber actuator pushrod comprising:
   at least two sequences of magnets configured to move in association with said pushrod, said at least two sequences of magnets collectively forming a Grey code;
   a sensor system configured to detect a polarity of said magnets at positions adjacent to said sensor system and produce at least one signal indicative of the polarity; and
   a processor configured to convert the at least one signal into an indication of the position of the pushrod.

2. The brake stroke sensor of claim 1, wherein a first of said at least two sequences of magnets is shifted relative to a second of said at least two sequences of magnets.

3. The brake stroke sensor of claim 1, wherein a first sensor of said sensor system is shifted relative to a second sensor of said sensor system.

4. The brake stroke sensor of claim 1, wherein said at least two columns comprise seven columns.

5. The brake stroke sensor of claim 1 wherein said sensor system comprises a sensor for each sequence of said at least two sequences of magnets.

6. The brake stroke sensor of claim 1 wherein said sensor for each sequence of said at least two sequences of magnets is a Hall Effect switch.

7. The brake stroke sensor of claim 1, wherein said at least two sequences of magnets is not in electrical contact with said sensor system.

8. The brake stroke sensor of claim 7, wherein said at least two sequences of magnets are enclosed within a non-conductive covering.

9. The brake stroke sensor of claim 1 wherein said at least two sequences of magnets is disposed about said pushrod at substantially equidistant positions.

10. A brake stroke sensor for detecting a position of a brake pushrod comprising:
    a plurality of columns of magnets configured to move in accordance with the pushrod, at least one of said plurality of columns of magnets being shifted along its axis relative to another column of magnets;
    a sensor for each column of magnets said sensor being configured to detect a pole of a magnet in the column of magnets within a sensing range of the sensor; and
    a processor configured to receive data originating from each sensor and to provide an indication of a position of the brake pushrod.

11. The brake stroke sensor of claim 10, wherein the plurality of columns of magnets extend axially along said pushrod, and collectively define a plurality of rings of magnets radially along said pushrod, said plurality of rings of magnets collectively forming a Grey code.

12. The brake stroke sensor of claim 10, further comprising a non-conductive sheath enclosing said plurality of columns of magnets.

13. The brake stroke sensor of claim 10, wherein said plurality of columns of magnets are disposed about said pushrod at substantially equidistant positions.

14. The brake stroke sensor of claim 10 wherein said sensors comprise Hall-effect switches.

15. A method of determining a position of a brake actuator pushrod, said method comprising:
    configuring a plurality of columns of magnets to move in accordance with the brake actuator pushrod, at least one column of magnets being shifted in a direction parallel to the brake actuator pushrod relative to another column of magnets;
    monitoring, as the pushrod moves relative to a location, a polarity of each of said plurality of columns of magnets adjacent the location;
    converting the results of said monitoring into an indicator signal representing the position of the brake actuator pushrod; and
    outputting, in accordance with the indicator signal, data that indicates the position of the brake actuator pushrod.

16. The method of claim 15, wherein at most one of the detected states of the plurality of magnets changes at a time.

17. The method of claim 15, wherein said configuring further comprises configuring the plurality of columns of magnets to define a Grey code.

18. The method of claim 15 wherein said monitoring comprises providing Hall-effect switches.

19. A method of detecting a relative position of a brake pushrod, the method comprising:
    configuring a plurality of magnets to move in accordance with the pushrod, the plurality of magnets collectively forming a Grey code;
    arranging a sensor system at a location;
    sensing, by the sensor system, a plurality of magnet poles from the plurality of magnets adjacent the location; and
    producing, from the results of said sensing, a positional signal representative of the relative position of the brake pushrod.

20. The method of claim 19, wherein at most one of the detected states of the plurality of magnets changes at a time.

21. The method of claim 19, wherein said configuring further comprises configuring the plurality of columns of magnets to define a Grey code.

22. The method of claim 19 wherein said sensing comprises sensing using Hall-Effect switches.

* * * * *